United States Patent
Kurahashi

(10) Patent No.: US 11,340,954 B2
(45) Date of Patent: May 24, 2022

(54) CONTROL DEVICE AND DISTRIBUTED PROCESSING METHOD

(71) Applicant: Mitsubishi Electric Corporation, Tokyo (JP)

(72) Inventor: Hiroaki Kurahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/440,791

(22) PCT Filed: May 23, 2019

(86) PCT No.: PCT/JP2019/020497
§ 371 (c)(1),
(2) Date: Sep. 20, 2021

(87) PCT Pub. No.: WO2020/235088
PCT Pub. Date: Nov. 26, 2020

(65) Prior Publication Data
US 2022/0121168 A1    Apr. 21, 2022

(51) Int. Cl.
*G06F 9/50* (2006.01)
*G06F 11/30* (2006.01)
(Continued)

(52) U.S. Cl.
CPC ......... *G06F 9/505* (2013.01); *G05B 19/0421* (2013.01); *G05B 19/4148* (2013.01);
(Continued)

(58) Field of Classification Search
None
See application file for complete search history.

(56) References Cited

U.S. PATENT DOCUMENTS

2013/0125117 A1    5/2013    Niesser et al.
2014/0380326 A1    12/2014   Kurihara

FOREIGN PATENT DOCUMENTS

JP    2003-9197 A    1/2003
JP    2004-94473 A   3/2004
(Continued)

OTHER PUBLICATIONS

Liu et al., "DeMS: A hybrid scheme of task scheduling and load balancing in computing clusters", May 22, 2015, Elsevier Ltd., pp. 213-220. (Year: 2015).*

(Continued)

*Primary Examiner* — Qing Yuan Wu
(74) *Attorney, Agent, or Firm* — Xsensus LLP

(57) ABSTRACT

A control device (1) includes a master-information processing unit (10), and a slave-information processing unit (20) including an information processing CPU (220) that performs information processing through a general-purpose OS, and a distribution control CPU (210) that measures an operating state of the information processing CPU (220) through a real-time OS. The master-information processing unit (10) acquires, from the slave-information processing unit (20), information indicating the operating state of the information processing CPU (220) in the slave-information processing unit (20), determines, based on the acquired information, whether to request the slave-information processing unit (20) to perform information processing, and transmits, when determining to request the slave-information processing unit (20) to perform the information processing, a signal requesting the information processing to the slave-information processing unit (20). The information (Continued)

processing CPU (220) in the slave-information processing unit (20) performs the information processing upon receiving the signal requesting the information processing.

9 Claims, 8 Drawing Sheets

(51) Int. Cl.
    *G06F 9/38*     (2018.01)
    *G05B 19/042*     (2006.01)
    *G05B 19/414*     (2006.01)

(52) U.S. Cl.
    CPC .............. *G06F 9/3877* (2013.01); *G06F 9/50* (2013.01); *G06F 9/5083* (2013.01); *G06F 11/30* (2013.01); *G06F 11/3003* (2013.01); *G06F 11/3065* (2013.01); *G05B 2219/14014* (2013.01); *G05B 2219/24186* (2013.01); *G05B 2219/24187* (2013.01); *G05B 2219/24188* (2013.01); *G05B 2219/24189* (2013.01); *G05B 2219/33334* (2013.01)

(56) References Cited

FOREIGN PATENT DOCUMENTS

| | | |
|---|---|---|
| JP | 2008-186173 A | 8/2008 |
| JP | 2013-246584 A | 12/2013 |
| JP | 2017-162337 A | 9/2017 |
| WO | 2013/140518 A1 | 9/2013 |

OTHER PUBLICATIONS

International Search Report and Written Opinion dated Aug. 6, 2019, received for PCT Application PCT/JP2019/020497, Filed on May 23, 2019, 8 pages including English Translation.

Notice of Reasons for Refusal dated Jul. 14, 2020, received for Japanese Application 2020-512628, 5 pages including English Translation.

Decision to Grant dated Nov. 10, 2020, received for Japanese Application 2020-512628, 5 pages including English Translation.

\* cited by examiner

FIG. 4

INFORMATION PROCESSING UNIT
MANAGEMENT INFORMATION

| UNIT ID | TYPE | CONNECTION STATE |
|---|---|---|
| U00001 | MASTER | - |
| U00002 | SLAVE | ON |
| U00003 | SLAVE | ON |
| U00004 | SLAVE | OFF |
| ⋮ | ⋮ | ⋮ |

FIG. 5

CPU OPERATING STATE HISTORY INFORMATION

| UNIT ID | DATE | TIME | CPU USAGE RATE | MEMORY USAGE RATE | I/O LOAD |
|---|---|---|---|---|---|
| U00001 | 2019/1/11 | 12:15:16 | 30% | 10% | 2 |
| U00001 | 2019/1/11 | 12:15:15 | 28% | 8% | 1 |
| U00001 | 2019/1/11 | 12:15:14 | 25% | 7% | 0 |
| U00002 | 2019/1/11 | 12:15:16 | 70% | 90% | 10 |
| U00002 | 2019/1/11 | 12:15:15 | 60% | 80% | 5 |
| U00002 | 2019/1/11 | 12:15:14 | 50% | 70% | 4 |
| U00003 | 2019/1/11 | 12:15:16 | 10% | 5% | 1 |
| U00003 | 2019/1/11 | 12:15:15 | 7% | 4% | 0 |
| U00003 | 2019/1/11 | 12:15:14 | 11% | 6% | 1 |
| ⋮ | ⋮ | ⋮ | ⋮ | ⋮ | ⋮ |

FIG. 6

TASK EXECUTION REQUEST HISTORY INFORMATION

| UNIT ID | DATE | TIME | DATA AMOUNT | TYPE |
|---------|------|------|-------------|------|
| U00002 | 2019/1/11 | 12:14:53 | 500MB | WAVEFORM ANALYSIS |
| U00003 | 2019/1/11 | 12:14:52 | 300MB | WAVEFORM ANALYSIS |
| U00003 | 2019/1/10 | 15:13:41 | 700MB | SEARCH |
| . | . | . | . | . |
| . | . | . | . | . |
| . | . | . | . | . |

*FIG. 8*

CPU OPERATING STATE INFORMATION

| UNIT ID | CPU USAGE RATE | MEMORY USAGE RATE | I/O LOAD |
|---|---|---|---|
| U00001 | 30% | 10% | 2 |
| U00002 | 70% | 90% | 10 |
| U00003 | 10% | 5% | 1 |
| ⋮ | ⋮ | ⋮ | ⋮ |

CONTROL DEVICE AND DISTRIBUTED PROCESSING METHOD

CROSS-REFERENCE TO RELATED APPLICATION

The present application is based on PCT filing PCT/JP2019/020497, filed May 23, 2019, the entire contents of which are incorporated herein by reference.

TECHNICAL FIELD

The present disclosure relates to a control device and a distributed processing method.

BACKGROUND ART

Techniques have been studied for distributing a load on a programmable logic controller (PLC) that performs processing for controlling devices. For example, Patent Literature 1 describes a technique for causing processing target data generated by a controller to be transmitted to a data processor by, on behalf of the controller, another controller having a smaller load.

CITATION LIST

Patent Literature

Patent Literature 1: Unexamined Japanese Patent Application Publication No. 2004-094473

SUMMARY OF INVENTION

Technical Problem

The processing for controlling devices may include information processing with high load of computation, such as analyzing data acquired from, for example, devices or sensors, modeling device behaviors, and computation for, for example, anomaly detection. However, the computational load may be large depending on the operating state of a processor performing information processing. This may cause a delay in the overall processing. The technique described in Patent Literature 1 merely reduces the load of transmitting and receiving data without reducing the computational load, thus failing to eliminate the delay in the overall processing.

In response to the above issue, an objective of the present disclosure is to provide a control device that distributes the load of information processing depending on the operating state of a processor, and a distributed processing method.

Solution to Problem

To achieve the above objective, a control device according to an aspect of the present disclosure includes a first information processing unit and a second information processing unit. The second information processing unit includes a first processor that performs information processing through a general-purpose operating system, and a second processor that measures an operating state of the first processor through a real-time operating system. The first information processing unit acquires, from the second information processing unit, information indicating the operating state of the first processor in the second information processing unit, determines, based on the acquired information, whether to request the second information processing unit to perform information processing, and transmits, when determining to request the second information processing unit to perform the information processing, a signal requesting the information processing to the second information processing unit. The first processor in the second information processing unit performs the information processing upon receiving the signal requesting the information processing.

Advantageous Effects of Invention

The technique according to the above aspect of the present disclosure enables a unit to acquire information indicating the operating state of a processor in another unit, and request, based on the acquired information, the another unit to perform information processing, thus distributing the load of the information processing depending on the operating state of the processor.

BRIEF DESCRIPTION OF DRAWINGS

FIG. 4 is a diagram showing example management information for an information processing unit in Embodiment 2 of the present disclosure;

FIG. 5 is a diagram showing example history information for the CPU operating state in Embodiment 2 of the present disclosure;

FIG. 6 is a diagram showing example history information for a task execution request in Embodiment 2 of the present disclosure;

FIG. 8 is a diagram showing example information for the CPU operating state in Embodiment 2 of the present disclosure.

DESCRIPTION OF EMBODIMENTS

Embodiment 1

A control device according to embodiments of the present disclosure will now be described with reference to the drawings.

Figure 1:
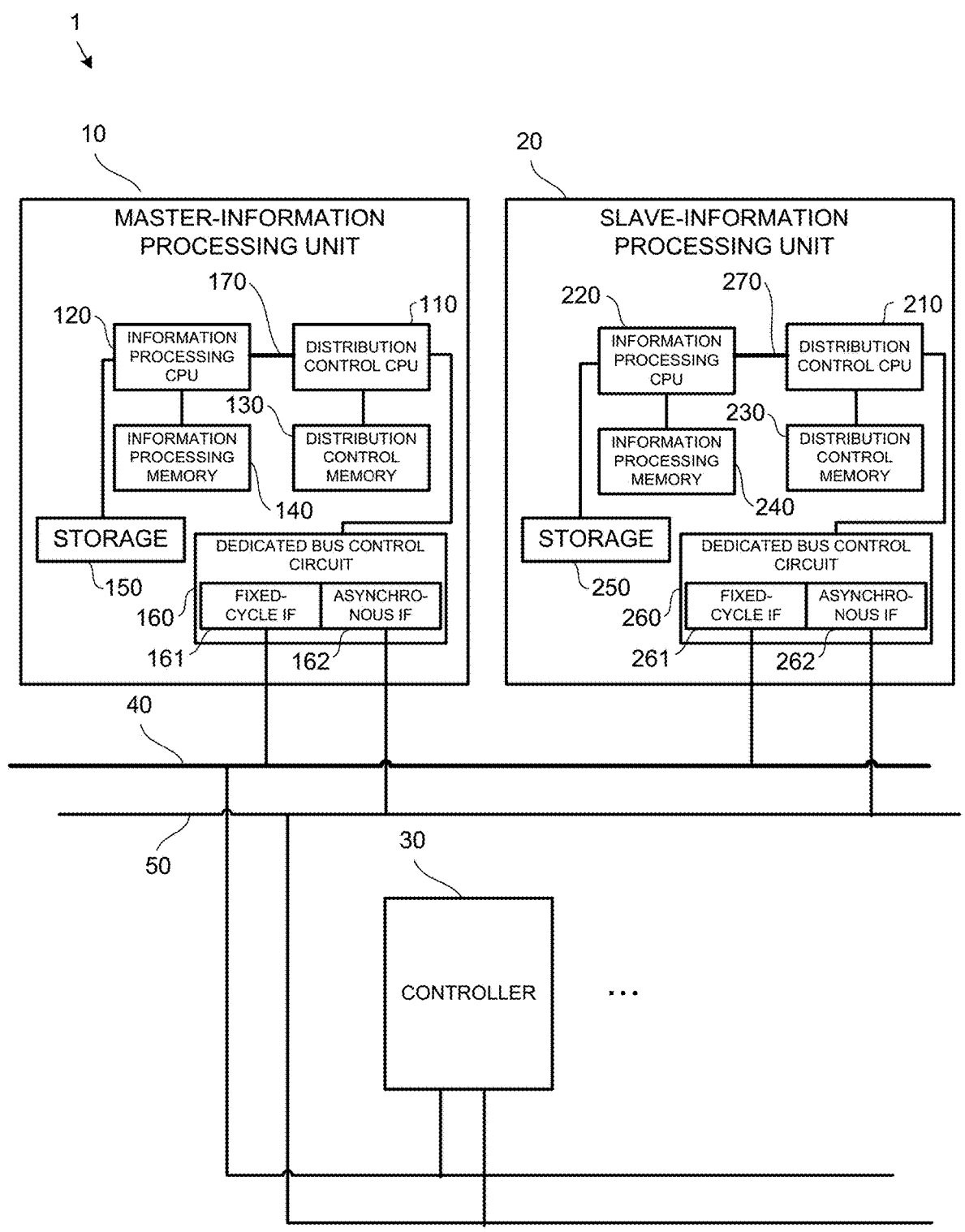
FIG. 1 is a hardware diagram of a control device according to Embodiment 1 of the present disclosure.

A control device 1 according to the present embodiment is a programmable logic controller (PLC) for controlling various devices. As shown in FIG. 1, the control device 1 includes a master-information processing unit 10 for executing an information processing task, a slave-information processing unit 20 as a subunit for executing an information processing task, a controller 30 for controlling various devices, a fixed-cycle bus 40 as a communication channel for performing fixed-cycle communication, and an asynchronous bus 50 as a communication channel for performing asynchronous communication.

The master-information processing unit 10 receives device data from the controller 30 and executes a computational task based on the received device data. The master-information processing unit 10 includes a distribution control central processing unit (CPU) 110 for controlling processing for task distribution, an information processing CPU 120 for performing information processing, a distribution control memory 130 for storing data to be processed by the distribution control CPU 110, an information processing memory 140 for storing data to be processed by the information processing CPU 120, a storage 150 for storing various items of information, a dedicated bus control circuit 160 for controlling dedicated buses, and a serial interface (IF) 170. The master-information processing unit 10 is an example of a first information processing unit recited in the claims.

The distribution control CPU 110 controls processing for task distribution. More specifically, the distribution control CPU 110 measures the operating state of the information processing CPU 120. The distribution control CPU 110 determines the connection state of the slave-information processing unit 20. The distribution control CPU 110 determines whether to request the slave-information processing unit 20 to perform task processing. The distribution control CPU 110 is an example of a second processor recited in the claims.

The information processing CPU 120 performs information processing. More specifically, the information processing CPU 120 performs a computation based on device data received from the controller 30. The information processing CPU 120 divides device data to request the slave-information processing unit 20 to perform task processing. The information processing CPU 120 is an example of a first processor recited in the claims.

The distribution control memory 130 is a main storage for storing data to be processed by the distribution control CPU 110. The distribution control memory 130 stores a real-time operating system (OS) used by the distribution control CPU 110 to perform processing. The real-time OS specifies a time limit by which a computation is to be performed or complete from when an instruction is received. The distribution control memory 130 stores an application for monitoring the operating state of the information processing CPU 120 and acquiring information indicating the operating state.

The information processing memory 140 is a main memory for storing data to be processed by the information processing CPU 120. The information processing memory 140 stores a general-purpose OS used by the information processing CPU 120 to perform processing. The general-purpose OS is an OS having basic functions including connection to a network, transmission through a network, text output, and simultaneous execution of programs. The distribution control memory 130 and the information processing memory 140 each store a communication driver.

The storage 150 is an external memory for storing various items of information. More specifically, the external memory is, for example, a hard disk drive, a solid state drive (SSD), a flash memory, or a magnetic tape. The storage 150 stores device data to be processed by the information processing CPU 120. The storage 150 is an example of a storage recited in the claims.

The dedicated bus control circuit 160 is an electronic circuit for controlling dedicated buses. The dedicated buses are communication channels connecting the master-information processing unit 10, the slave-information processing unit 20, and the controller 30 to one another. The dedicated buses include the fixed-cycle bus 40 and the asynchronous bus 50. The dedicated bus control circuit 160 includes a fixed-cycle IF 161 for controlling the connection between the master-information processing unit 10 and the fixed-cycle bus 40, and an asynchronous IF 162 for controlling the connection between the master-information processing unit 10 and the asynchronous bus 50.

The serial IF 170 is a communication channel connecting the distribution control CPU 110 and the information processing CPU 120 to each other. The distribution control CPU 110 implements the communication driver stored in the distribution control memory 130 on the real-time OS. The information processing CPU 120 implements the communication driver stored in the information processing memory 140 on the general-purpose OS. The distribution control CPU 110 and the information processing CPU 120 thus transmit and receive various items of data to and from each other at high speed through the serial IF 170. For example, the distribution control CPU 110 executes an application stored in the distribution control memory 130 on the real-time OS to acquire, through communication enabled by the communication driver, information indicating the operating state of the information processing CPU 120 through the serial IF 170. The distribution control CPU 110 can access the information processing memory 140 through the serial IF 170. Similarly, the information processing CPU 120 can access the distribution control memory 130 through the serial IF 170.

Upon receiving a request to perform distributed task processing from the master-information processing unit 10, the slave-information processing unit 20 executes an information processing task. The slave-information processing unit 20 has the same hardware configuration as the master-information processing unit 10. More specifically, the slave-information processing unit 20 includes a distribution control CPU 210 for controlling processing for task distribution, an information processing CPU 220 for performing information processing, a distribution control memory 230 for storing data to be processed by the distribution control CPU 210, an information processing memory 240 for storing data to be processed by the information processing CPU 220, a storage 250 for storing various items of information, a dedicated bus control circuit 260 for controlling dedicated buses, and a serial IF 270. The dedicated bus control circuit 260 includes a fixed-cycle IF 261 for controlling the connection to the fixed-cycle bus 40 and an asynchronous IF 262 for controlling the connection to the asynchronous bus 50. The slave-information processing unit 20 is an example of a second information processing unit recited in the claims.

The controller 30 controls devices controlled by the control device 1. Controlling devices refers to controlling a sequence of various devices using an application developed using a language dedicated for device control, such as ladder language and function block diagram (FBD) language. More specifically, the controller 30 includes a CPU for controlling various units, a motion unit for controlling, for example, servo amplifiers and servomotors, an input-output unit for receiving and transmitting on/off signals of devices, an analog unit for inputting and outputting data to and from analog devices including sensors, a network unit for connection to a host information system, other control systems, and other systems, and other units. The controller 30 transmits device data to be computed to the master-information processing unit 10.

The fixed-cycle bus 40 is a communication channel used to periodically transfer data from one unit to another unit. For example, the motion unit uses the fixed-cycle bus 40 to receive and transmit data to be punctual, such as data for synchronous control, velocity control, and positioning control.

The asynchronous bus 50 is a communication channel used to transfer data with unspecified timing from one unit to another unit. For example, the asynchronous bus 50 is used to transfer device data to be processed between the master-information processing unit 10 and the slave-information processing unit 20.

The operation of the control device 1 will now be described with reference to the drawings. The distribution control memory 130 in the master-information processing unit 10 prestores, as setting information, a reference time period for which a response is to be waited for. The distribution control CPU 210 in the slave-information processing unit 20 periodically measures the operating state of the information processing CPU 220 and stores information about the CPU operating state indicating the measured operating state into the distribution control memory 230. More specifically, the CPU operating state information includes the usage rate of the information processing CPU 220, the usage rate of the information processing memory 240, and the input-output (I/O) load. The I/O load is represented by, for example, the number of blocks per unit time in reading from and writing into the storage 250. A block represents a unit amount of data read and written by a general-purpose OS.

The distribution control memory 130 in the master-information processing unit 10 further prestores, as setting information, request conditions for requesting task execution based on the CPU operating state. For example, the distribution control memory 130 stores request conditions including the usage rate of the information processing CPU 220 being 50% or less, the usage rate of the information processing memory 240 being 50% or less, and the I/O load being 5 or less.

The controller 30 in the control device 1 acquires device data and transmits the device data to the master-information processing unit 10 through the asynchronous bus 50. The master-information processing unit 10 receives the device data through the asynchronous IF 162 in the dedicated bus control circuit 160. The distribution control CPU 110 buffers the received device data in the distribution control memory 130. The controller 30 transmits a signal requesting to perform a computation for analyzing the device data to the master-information processing unit 10 through the asynchronous bus 50. Upon receiving a signal requesting to perform a computation through the distribution control CPU 110, the information processing CPU 120 in the master-information processing unit 10 reads the device data buffered in the distribution control memory 130 through the serial IF 170, and stores the device data into the storage 150.

The master-information processing unit 10 then starts a task execution request process to request the slave-information processing unit 20 to perform the computation requested by the controller 30.

Figure 2:
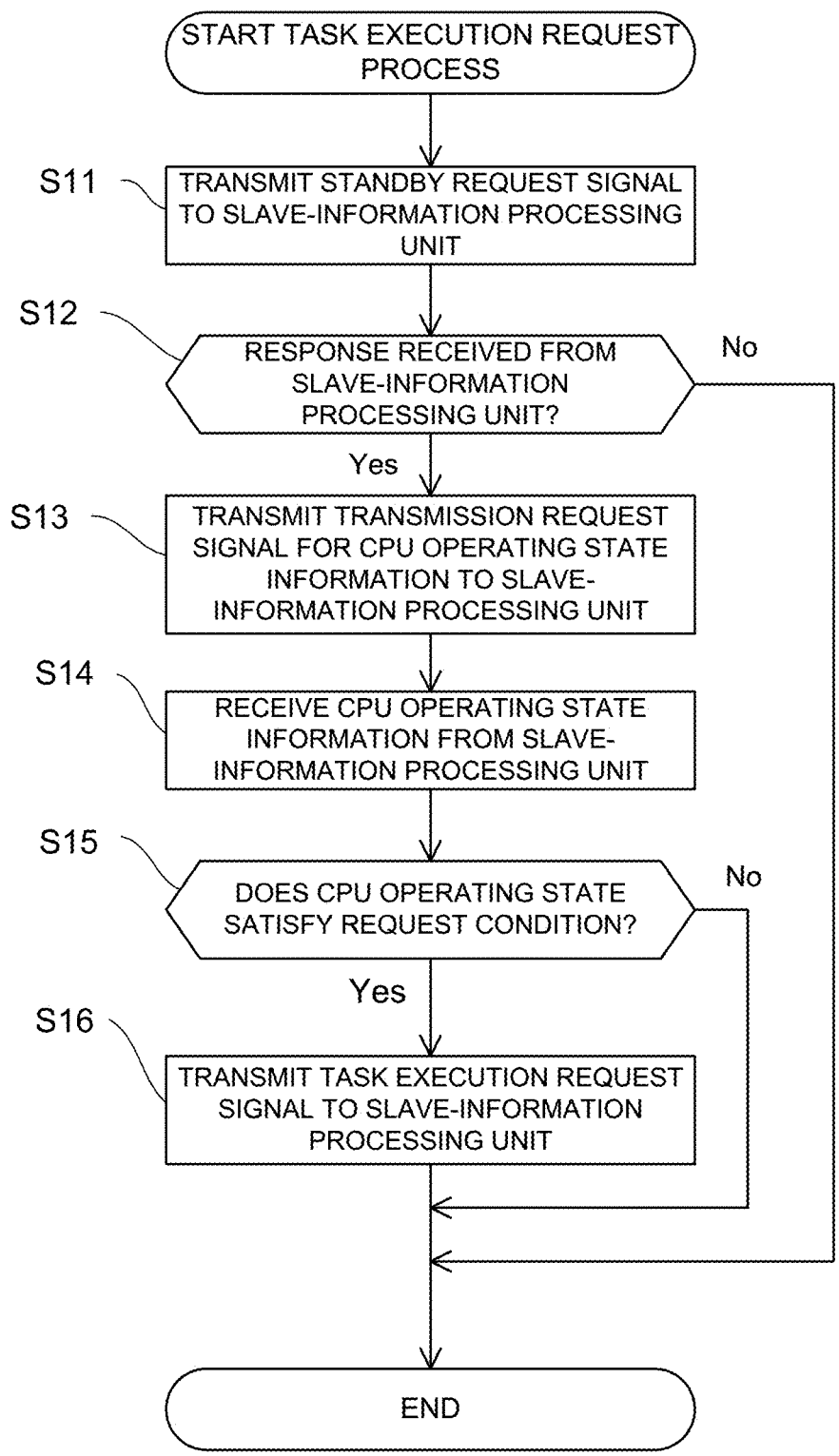
FIG. 2 is a flowchart of a task execution request process in Embodiment 1 of the present disclosure.

When the master-information processing unit 10 starts the task execution request process, as shown in FIG. 2, the distribution control CPU 110 transmits a standby request signal to the slave-information processing unit 20 (step S11). The slave-information processing unit 20 that has received the standby request signal transmits a response indicating that the slave-information processing unit 20 is on standby when the slave-information processing unit 20 can perform a computation.

The distribution control CPU 110 then determines whether a response is received from the slave-information processing unit 20 (step S12). More specifically, the distribution control CPU 110 acquires, from the distribution control memory 130, the reference time period to be waited for a response. The distribution control CPU 110 then determines whether a response is received before the reference time period elapses after transmitting the standby request signal in step S11.

When no response is received (No in step S12), the distribution control CPU 110 ends the task execution request process. When a response is received (Yes in step S12), the distribution control CPU 110 transmits, to the slave-information processing unit 20, a signal requesting transmission of information about the CPU operating state (step S13). Upon receiving the signal requesting transmission of the CPU operating state information through the asynchronous IF 262, the distribution control CPU 210 in the slave-information processing unit 20 transmits, to the master-information processing unit 10, the CPU operating state information stored in the distribution control memory 230 through the asynchronous bus 50.

The distribution control CPU 110 then receives the CPU operating state information from the slave-information processing unit 20 (step S14). The distribution control CPU 110 stores the CPU operating state information received through the asynchronous bus 50 into the distribution control memory 130.

The distribution control CPU 110 then determines whether the CPU operating state satisfies request conditions (step S15). For example, when the distribution control memory 130 stores request conditions including the usage rate of the information processing CPU 220 being 50% or less, the usage rate of the information processing memory 240 being 50% or less, and the I/O load being 5 or less, the distribution control CPU 110 determines whether the CPU operating state satisfies the request conditions.

When the CPU operating state fails to satisfy the request conditions (No in step S15), the distribution control CPU 110 ends the task execution request process. When the CPU operating state satisfies the request conditions (Yes in step S15), the distribution control CPU 110 transmits a task execution request signal to the slave-information processing unit 20 (step S16). The distribution control CPU 110 acquires device data stored in the storage 150 through the serial IF 170 and transmits the device data to the slave-information processing unit 20 through the asynchronous bus 50. The master-information processing unit 10 then ends the task execution request process.

The master-information processing unit 10 performs a task execution request process, and requests, depending on the operating state of the slave-information processing unit 20, the slave-information processing unit 20 to execute a task. When the slave-information processing unit 20 cannot execute a computational task, the information processing CPU 120 executes the computational task.

In the control device 1 according to the present embodiment, the distribution control CPU 210 measures the operating state of the information processing CPU 220 in the slave-information processing unit 20 through the real-time OS. The control device 1 thus acquires accurate operating information independently of the load on the information processing CPU 220. The distribution control CPU 110 in the master-information processing unit 10 determines whether to request execution of a task. The control device 1 can thus determine whether to request the slave-information processing unit 20 to execute a task independently of the load on the information processing CPU 120.

The transmission and reception of the CPU operating state information, device data, and other data are performed through the asynchronous bus 50, which is different from the fixed-cycle bus 40. The execution of a task can thus be distributed without affecting the punctuality of the transmission and reception of data.

Embodiment 2

In the example described in Embodiment 1, a task for an information processing unit is executed by another information processing unit on behalf of the information processing unit. In an example described in the present embodiment, a task is systematically distributed to multiple information processing units and executed. The present embodiment will now be described focusing on the differences from Embodiment 1.

Figure 3:
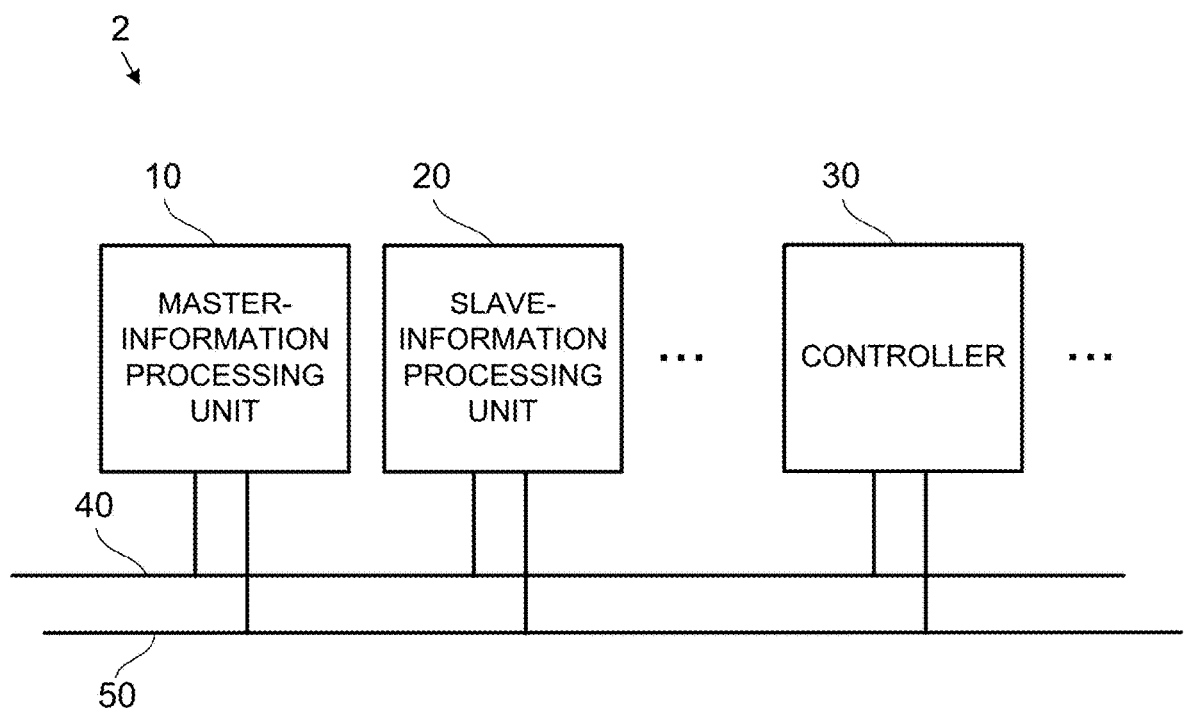
FIG. 3 is a hardware diagram of a control device according to Embodiment 2 of the present disclosure.

As shown in FIG. 3, a control device 2 according to the present embodiment includes a single master-information processing unit 10, multiple slave-information processing units 20, and the controller 30.

The distribution control CPU 110 in the master-information processing unit 10 measures the operating state of the information processing CPU 120 periodically, or for example, every 10 seconds, updates information indicating the measured CPU operating state, and stores the information into the distribution control memory 130. The distribution control CPU 110 stores, in a cumulative manner, the information indicating the measured CPU operating state into the storage 150 through the serial IF 170. In other words, the storage 150 stores history information about the CPU operating state.

Similarly, the distribution control memory 230 in each slave-information processing unit 20 stores the latest information indicating the CPU operating state of the information processing CPU 220, and the storage 250 stores history information about the CPU operating state.

The distribution control CPU 110 in the master-information processing unit 10 transmits, periodically, or for example, at daily intervals, to each slave-information processing unit 20 through the asynchronous bus 50, a signal requesting to transmit information about the history of the CPU operating state. Upon receiving the signal, each slave-information processing unit 20 transmits the CPU operating state history information stored in the storage 250 to the master-information processing unit 10 through the asynchronous bus 50. The distribution control CPU 110 in the master-information processing unit 10 combines the received information, creates the CPU operating state history information as shown in FIG. 5, and stores the CPU operating state history information into the storage 150. The CPU operating state history information includes the unit ID for identifying the information processing unit, date, time, CPU usage rate indicating the usage rate of the information processing CPU 220, the memory usage rate indicating the usage rate of the information processing memory 240, the I/O load indicating the load on the information processing CPU 220 reading from and writing into the storage 250, and other information.

The information processing CPU 120 in the master-information processing unit 10 stores, through a task distribution described later, task execution request history information indicating the history of requesting each slave-information processing unit 20 to execute a task into the storage 150. As shown in FIG. 6, the task execution request history information includes the unit ID for identifying the information processing unit, date, time, data amount of target device data for task execution, type indicating the type of the task, and other information.

The storage 150 also stores a trained model for distributing a task. The trained model uses, as input elements, the CPU operating states of the master-information processing unit 10 and each slave-information processing unit 20, the data amount of the task, and the type of the task. The trained model uses, as output elements, slave-information processing units 20 to which a task is to be distributed and the data amount divided for each of the slave-information processing units 20. The trained model pre-establishes correlations between the data amount of a task and the CPU operating state or between the type of a task and the CPU operating state through analysis using machine learning using, for example, a neural network, a decision tree, a support-vector machine, or a hidden Markov model, based on the CPU operating state history information and the task execution request history information stored in the storage 150.

The information processing CPU 120 in the master-information processing unit 10 updates the trained model trained through machine learning, periodically, or for example, at daily intervals, using the CPU operating state history information and the task execution request history information as learning data.

The distribution control CPU 110 in the master-information processing unit 10 transmits, periodically, or for example, every one minute, a packet for detecting the connection state to each slave-information processing unit 20 through the fixed-cycle bus 40. The distribution control CPU 210 in each slave-information processing unit 20 transmits a signal indicating the reception of the packet to the master-information processing unit 10 through the fixed-cycle bus 40. The distribution control CPU 110 in the master-information processing unit 10 creates information about management of the information processing unit based on signals transmitted from the slave-information processing units 20 and stores the information processing unit management information into the distribution control memory 130. As shown in FIG. 4, the information processing unit management information includes the unit ID for identifying the information processing unit, the type for identifying a master or a slave, and the connection state. A slave-information processing unit 20 that has transmitted a signal responding to the packet has an ON-connection state. A slave-information processing unit 20 that has transmitted no signal has an OFF-connection state.

The operation of the control device 2 according to the present embodiment will now be described with reference to the drawings. The master-information processing unit 10 starts a task distribution to distribute a computation requested by the controller 30 to slave-information processing units 20 and thus perform the computation.

Figure 7:
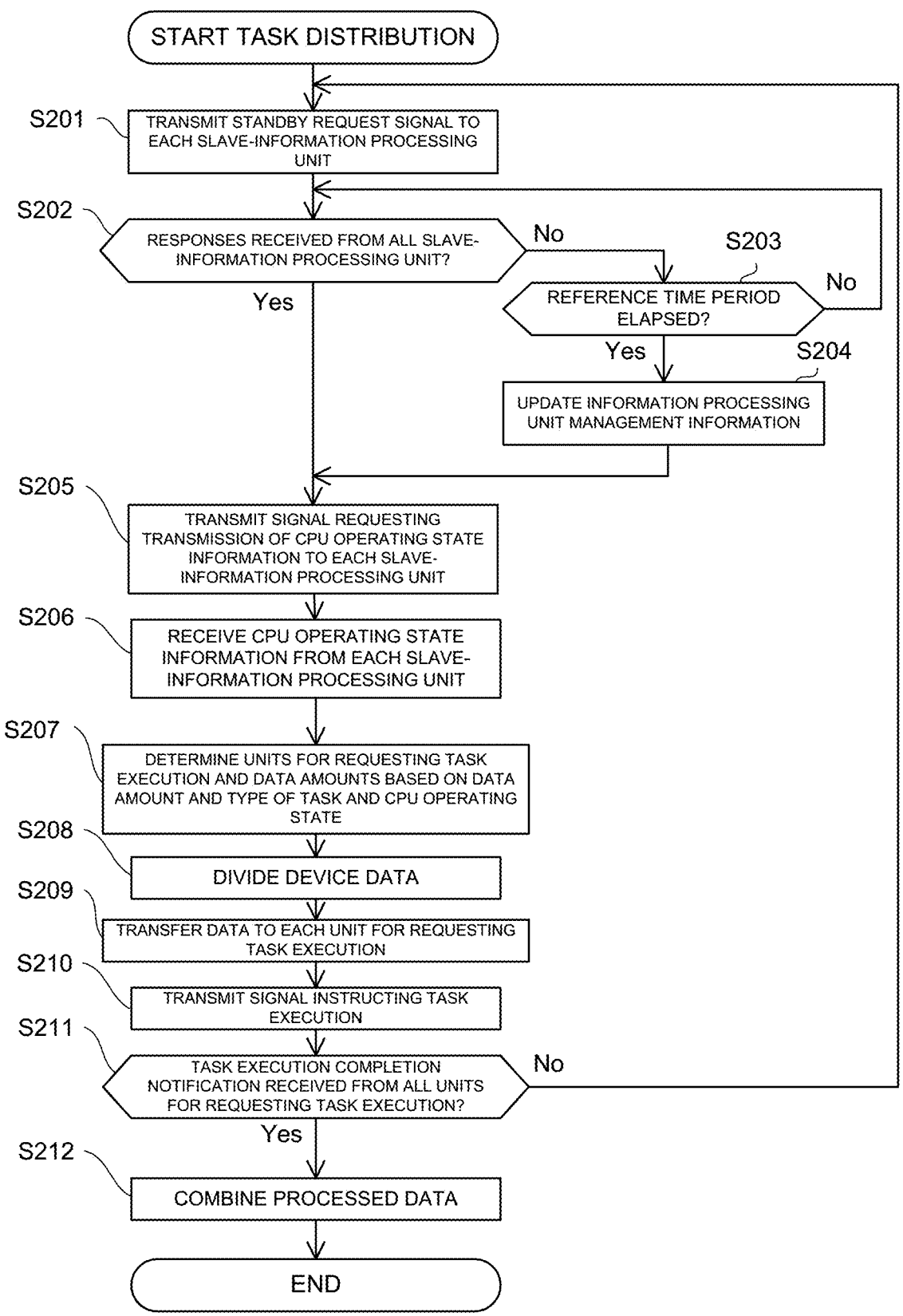
FIG. 7 is a flowchart of a task distribution in Embodiment 2 of the present disclosure.

When the master-information processing unit 10 starts the task distribution, as shown in FIG. 7, the distribution control CPU 110 transmits a standby request signal to each slave-information processing unit 20 (step S201). More specifically, the distribution control CPU 110 transmits standby request signals to slave-information processing units 20 having the information processing unit management information including an ON-connection state. Each slave-information processing unit 20 that has received the standby request signal transmits a response indicating that the slave-information processing unit 20 is on standby when the slave-information processing unit 20 can perform a computation.

The distribution control CPU 110 then determines whether responses are received from all the slave-information processing units 20 (step S202). When responses have not been received from all the slave-information processing units 20 (No in step S202), the distribution control CPU 110 determines whether the reference time period has elapsed after the last transmission of a standby request signal from the distribution control CPU 110 to any slave-information processing unit 20 (step S203). When the reference time period has not elapsed (No in step S203), the distribution control CPU 110 returns to the processing in step S202. When the reference time period has elapsed (Yes in step S203), the distribution control CPU 110 updates the information processing unit management information (step S204). More specifically, the distribution control CPU 110 updates the information to an OFF-connection state for any slave information processing unit 20 that has transmitted no response after the reference time period elapses.

When responses are received from all the slave-information processing units 20 in the processing in step S202 (Yes in step S202) or subsequent to the processing in step S204, the distribution control CPU 110 transmits, to each slave-information processing unit 20, a signal requesting transmission of the CPU operating state information (step S205).

The distribution control CPU 110 then receives the CPU operating state information from each slave-information processing unit 20 (step S206). The distribution control CPU 110 stores the CPU operating state information received through the asynchronous bus 50 into the distribution control memory 130. As shown in FIG. 8, the CPU operating state information includes the unit ID for identifying the information processing unit, the CPU usage rate indicating the usage rate of the information processing CPU 220, the memory usage rate indicating the usage rate of the information processing memory 240, the I/O load indicating the load on the information processing CPU 220 reading from and writing into the storage 250, and other information.

The information processing CPU 120 then determines, based on the data amount and the type of the task and CPU operating state, slave-information processing units 20 for requesting task execution and a data amount for each of these slave-information processing units 20 (step S207). More specifically, the information processing CPU 120 inputs, into the trained model, the CPU operating state information stored in the distribution control memory 130 and the data amount and the type of the task stored in the storage 150, and acquires, as output elements, slave-information processing units 20 for requesting task execution and a data amount for each of these slave-information processing units 20.

The information processing CPU 120 then divides device data into data amounts determined in step S207 (step S208). The information processing CPU 120 then transfers the divided device data to the slave-information processing units 20 for requesting task execution (step S209). The distribution control CPU 110 then transmits signals instructing to execute the task to the slave-information processing units 20 (step S210).

The information processing CPU 220 in each slave-information processing unit 20 that has received the signal instructing to execute the task in step S210 performs a computation for the device data transferred in the processing in step S209. When the information processing CPU 220 ends the computation, the distribution control CPU 210 in the slave-information processing unit 20 transmits a task execution completion notification to the master-information processing unit 10.

The distribution control CPU 110 then determines whether task execution completion notifications are received from all the slave-information processing units 20 for requesting task execution (step S211). When task execution completion notifications have not been received from all the slave-information processing units 20 for requesting task execution (No in step S211), the distribution control CPU 110 repeats the processing from step S201 for the remaining portion of the task.

When task execution completion notifications are received from all the slave-information processing units 20 for requesting task execution (Yes in step S211), the distribution control CPU 110 combines the processed data portions (step S212). More specifically, the distribution control CPU 110 transmits a signal requesting transmission of a processed data portion to each slave-information processing unit 20 and receives the processed data portion from each slave-information processing unit 20. The information processing CPU 120 then combines the received processed data portions and stores the resultant data into the storage 150.

The control device 2 according to the present embodiment distributes a computational task to multiple information processing units to execute the task in the manner described above, and thus has high computing performance. The control device 2 determines, based on the CPU operating state for each information processing unit, the data amounts into which device data is divided. The device data is thus divided into appropriate data amounts depending on the operating state. This enables efficient distributed processing.

The control device 2 uses a trained model acquired through machine learning for task division. The control device 2 thus divides a task into practical data amounts in accordance with past performance. Moreover, the trained model is updated based on past performance, thus allowing continuous improvement of the algorithm for distributing a computational task.

Modifications

The present disclosure is not limited to the above embodiments, and may be modified variously.

In the task distribution, the control device 2 according to Embodiment 2 distributes a task to multiple slave-information processing units 20. In some embodiments, the master-information processing unit 10 may perform information processing for a portion of divided device data. For the portion of the device data to be processed by the master-information processing unit 10 in this case, the processing in steps S209 to S211 is not necessary.

The control device 2 may request an external information processing device to execute a task. In this case, the master-information processing unit 10 may further include a network interface card connected to the distribution control CPU 110 or the information processing CPU 120. The master-information processing unit 10 may thus be communicably connected to the external information processing device and may periodically acquire the operating state of the CPU in the external information processing device as with the slave-information processing units 20.

Either the distribution control CPU 110 or the information processing CPU 120 may be selected differently from as described in the above embodiments to perform the processing for the portion of the processing for the master-information processing unit 10. More specifically, either the distribution control CPU 110 or the information processing CPU 120 may be selected to perform the processing based on the frequency of the processing and the load for each of the distribution control CPU 110 and the information processing CPU 120. Similarly, either the distribution control CPU 110 or the information processing CPU 120 may be selected differently from as described in the above embodiments to perform the processing for the portion of the processing for the slave-information processing unit 20. Either the fixed-cycle bus 40 or the asynchronous bus 50 may be selected differently from as described in the above embodiments as a communication channel.

The distribution control CPU 110 in the master-information processing unit 10 in the above embodiments may control devices. The distribution control CPU 110 can perform processing in parallel with the information processing CPU 120. The devices can thus be controlled without being affected by the information processing CPU 120 that has hung up due to a large load of information processing. In this case, the information processing CPU 120 alone may be restarted.

In the task distribution in Embodiment 2, when each slave-information processing unit 20 stops or suspends a computation, another slave-information processing unit 20 or the master-information processing unit 10 may take over the computation. More specifically, each slave-information processing unit 20 transfers processed data that has partially undergone the computation together with data indicating the progress of the computation to another slave-information processing unit 20 and the master-information processing unit 10. Thus, each of the slave-information processing units 20 and the master-information processing unit 10 has, in the storage 250 or the information processing memory 240, or in the storage 150 or the information processing memory 140, an area for storing data processed by information processing units having the information processing unit management information including an ON-connection state.

For each slave-information processing unit 20 stopping or suspending a computation, the master-information processing unit 10 periodically acquires the CPU operating state information for the slave-information processing unit 20, and determines, based on the acquired the CPU operating state information, whether the computation is stopped or suspended. When determining that the computation is stopped or suspended, the master-information processing unit 10 refers to data indicating the progress of the computation, and selects, based on the CPU operating state information, a slave-information processing unit 20 to perform the remaining computation. The master-information processing unit 10 then requests the selected slave-information processing unit 20 to execute the task. The master-information processing unit 10 may take over the task of the remaining computation. When a slave-information processing unit 20 that has suspended a computation can resume the computation with a restart of the general-purpose OS, the slave-information processing unit 20 transmits, to the master-information processing unit 10, standby information indicating that the computation is resumable, and stands by. The master-information processing unit 10 that has received the standby information determines the slave-information processing unit 20 as a candidate to be selected to perform processing when another slave-information processing unit 20 stops or suspends a computation or when a new task distribution starts.

Thus, when a slave-information processing unit 20 stops or suspends a computation without completing the computation, the computation can be resumed without wasting the portion of the computation already performed. This achieves more efficient execution of distributing a computational task.

To offset the risk arising when the master-information processing unit 10 stops operating due to any factor, the master functions may be transferred to a slave-information processing unit 20. More specifically, the master-information processing unit 10 preselects, based on the CPU operating state information, a slave-information processing unit 20 to which the master functions are to be taken over. The selected slave-information processing unit 20 monitors the operating state of the master-information processing unit 10, and backs up the CPU operating state information, the information processing unit management information, device data, and portions of data already processed in a computation together with data indicating the progress of the computation in the distribution control memory 230 and the storage 250 to smoothly transfer the master functions upon detecting that the master-information processing unit 10 stops. The master-information processing unit 10 provides, to unselected other slave-information processing units 20, information about the selected slave-information processing unit 20. Upon detecting that the master-information processing unit 10 stops, the unselected other slave-information processing units 20 switch to a slave-information processing unit 20 for transferring the items of information described above.

The master functions may be recovered when, for example, the master-information processing unit 10 is restarted or the operation is recovered through replacement of the unit. More specifically, upon detecting the recovery of the operation of the master-information processing unit 10, a slave-information processing unit 20 transmits a master function recovery request to the master-information processing unit 10. Upon receiving the recovery request, the master-information processing unit 10 determines whether to recover the master functions based on the CPU operating state of the master-information processing unit 10. When determining to recover the master functions, the master-information processing unit 10 provides information about the recovery of the master functions to the slave-information processing unit 20 that transmitted the recovery request. The slave-information processing unit 20 then transfers the CPU operating state information, the information processing unit management information, and the device data backed up in the distribution control memory 230 and the storage 250 together with portions of data already processed in a computation and data indicating the progress of the computation, and provides, to other slave-information processing units 20, information about the switching of the master functions. Upon completion of the transfer, the master-information processing unit 10 provides information about the recovery of the master functions to each slave-information processing unit 20. Each slave-information processing unit 20 switches back to the master-information processing unit 10 for transferring the items of information described above.

Thus, the computational function can be performed without being stopped when the master-information processing unit 10 stops operating. When the master-information processing unit 10 recovers, the original configuration can be restored.

Although the processors are CPUs in the above embodiments, the processors may be, for example, microprocessors or digital signal processors (DSPs).

In the above embodiments, information indicating the CPU operating state includes the CPU usage rate, the memory usage rate, and the I/O load. Information indicating the CPU operating state is not limited to the above, and may be, for example, the amount of virtual memory, free memory space, buffer memory, or cache memory, or the number of interrupts per unit time or program switches.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2 Control device
10 Master-information processing unit
20 Slave-information processing unit
30 Controller
40 Fixed-cycle bus
50 Asynchronous bus
110, 210 Distribution control CPU
120, 220 Information processing CPU
130, 230 Distribution control memory
140, 240 Information processing memory
150, 250 Storage
160, 260 Dedicated bus control circuit
161, 261 Fixed-cycle IF
162, 262 Asynchronous IF
170, 270 Serial IF

The invention claimed is:
1. A control device comprising:
a first information processor; and
a second information processor including
    a first processor to perform information processing through a general-purpose operating system, and
    a second processor to measure an operating state of the first processor through a real-time operating system,
wherein
the first information processor acquires, from the second information processor, information indicating the operating state of the first processor in the second information processor, determines, based on the acquired information, whether to request the second information processor to perform information processing, and transmits, when determining to request the second information processor to perform the information processing, a signal requesting the information processing to the second information processor, and
the first processor in the second information processor performs the information processing upon receiving the signal requesting the information processing.
2. A control device comprising:
a master-information processor; and
a plurality of slave-information processors, each of the plurality of slave-information processors including
    a first processor to perform information processing through a general-purpose operating system, and
    a second processor to measure an operating state of the first processor through a real-time operating system,
wherein the master-information processor acquires, from the plurality of slave-information processors, information indicating the operating state of the first processor in each of the plurality of slave-information processors, selects, based on the acquired information, one or more slave-information processors for requesting information processing from the plurality of slave-information processors, and transmits a signal requesting the information processing to the selected one or more slave-information processors.

3. The control device according to claim 2, wherein
the master-information processor includes
    a first processor to perform information processing through a general-purpose operating system, and
    a second processor to periodically transmit, through a real-time operating system to the plurality of slave-information processors, a packet for determining a connection state, and
the master-information processor determines one or more slave-information processors transmitting a response to the packet as the one or more slave-information processors for requesting the information processing.
4. The control device according to claim 3, wherein
the master-information processor further includes a storage to store target data for the information processing, and
the first processor in the master-information processor determines, based on the information indicating the operating state of the first processor acquired from each of the plurality of slave-information processors, an amount of data to be processed by each of the one or more slave-information processors for requesting the information processing, divides target data stored in the storage based on the determined amount of data, and transmits the divided target data to the selected one or more slave-information processors.
5. The control device according to claim 4, wherein
the storage in the master-information processor further stores a trained model using, as input elements, information indicating the operating state of the first processor in each of the plurality of slave-information processors a data amount of the target data, and
the first processor in the master-information processor, by referring to the trained model, selects one or more slave-information processors for requesting the information processing and determines the data amount.
6. The control device according to claim 5, wherein
the storage in the master-information processor further stores operating state history information indicating a history of the operating state of the first processor in each of the plurality of slave-information processors, and request history information indicating a history of requesting the information processing, and
the first processor in the master-information processor updates, based on the operating state history information and the request history information, the trained model stored in the storage.
7. The control device according to claim 3, wherein the second processor in the master-information processor performs processing for controlling a device based on a result of the information processing.
8. A distributed processing method for requesting execution of information processing in a control device including a first information processor and a second information processor including a processor to perform information processing through a general-purpose operating system, the method comprising:
    measuring, by the second information processor, an operating state of the processor through a real-time operating system; and
    by the first information processor, determining, based on the operating state of the processor, whether to request the second information processor to perform the information processing, and transmitting, when determining to request the second information processor to perform the information processing, a signal requesting the information processing to the second information processor.

9. A distributed processing method for distributing and executing information processing in a control device including a master information processor and a plurality of slave information processors each including a processor to perform information processing through a general-purpose operating system, the method comprising:
   measuring, by each of the plurality of slave information processors, an operating state of the processor through a real-time operating system; and
   by the master information processor, selecting, based on the operating state of the processor, one or more slave information processors for requesting the information processing from the plurality of slave information processors, and transmitting a signal requesting the information processing to the selected one or more slave information processors.

* * * * *